United States Patent [19]
Kennedy

[11] 3,766,800
[45] Oct. 23, 1973

[54] VARIABLE EFFICIENCY MECHANICAL TRANSMISSION

[75] Inventor: John C. Kennedy, Georgetown, Conn.

[73] Assignee: Norco, Inc., Town of Ridgefield, Fairfield, Conn.

[22] Filed: June 30, 1972

[21] Appl. No.: 268,058

[52] U.S. Cl............................................. 74/424.8 R
[51] Int. Cl................................................ F16h 1/18
[58] Field of Search....................... 74/441, 424.8 R, 74/424.8 A

[56] References Cited
UNITED STATES PATENTS

| | | | |
|---|---|---|---|
| 2,716,352 | 8/1955 | Wilson | 74/424.8 R |
| 3,296,880 | 1/1967 | Maroth | 74/424.8 R |
| 3,308,674 | 3/1967 | Maroth | 74/424.8 R |
| 3,334,526 | 8/1967 | Flarsheim | 74/424.8 R |
| 3,648,535 | 3/1972 | Maroth | 74/424.8 R |

*Primary Examiner*—Leonard H. Gerin
*Attorney*—H. Gibner Lehmann et al.

[57] ABSTRACT

A variable efficiency thread-type nut for use with a screw having a helical thread, the nut comprising a body having a through bore to receive the screw, a roller carried by the nut body and extending into the bore thereof so as to engage the screw thread, bearing means mounting the roller for turning movement and also for movement between advanced and retracted positions in the nut body, and yieldable means for biasing the roller to its advanced position and into engagement with the thread of the screw, as well as a thread means comprising one or more elements or shoulders rigidly carried in the bore of the nut body and engageable with a part of the screw thread. The thread elements or shoulders are normally out of engagement with the screw thread at such time as the axial loading between the screw and the nut is less than a predetermined level. Under these circumstances, the roller remains biased to its advanced, thread-engaging position. When the load exceeds the predetermined level, the biasing means enables the roller to yield under the load and thus shift to a retracted position whereupon the rigid shoulder or thread of the nut body frictionally engages the screw thread and effects an increased drag therewith, thus tending to retard relative (usually retrograde) turning between the nut body and screw. Upon removal of the heavy load, the roller again assumes its advanced, thread-engaging position and the shoulder becomes disengaged from the screw threads, thus enabling the nut and screw to undergo the normal, especially free relative turning movement.

10 Claims, 10 Drawing Figures

PATENTED OCT 23 1973 3,766,800

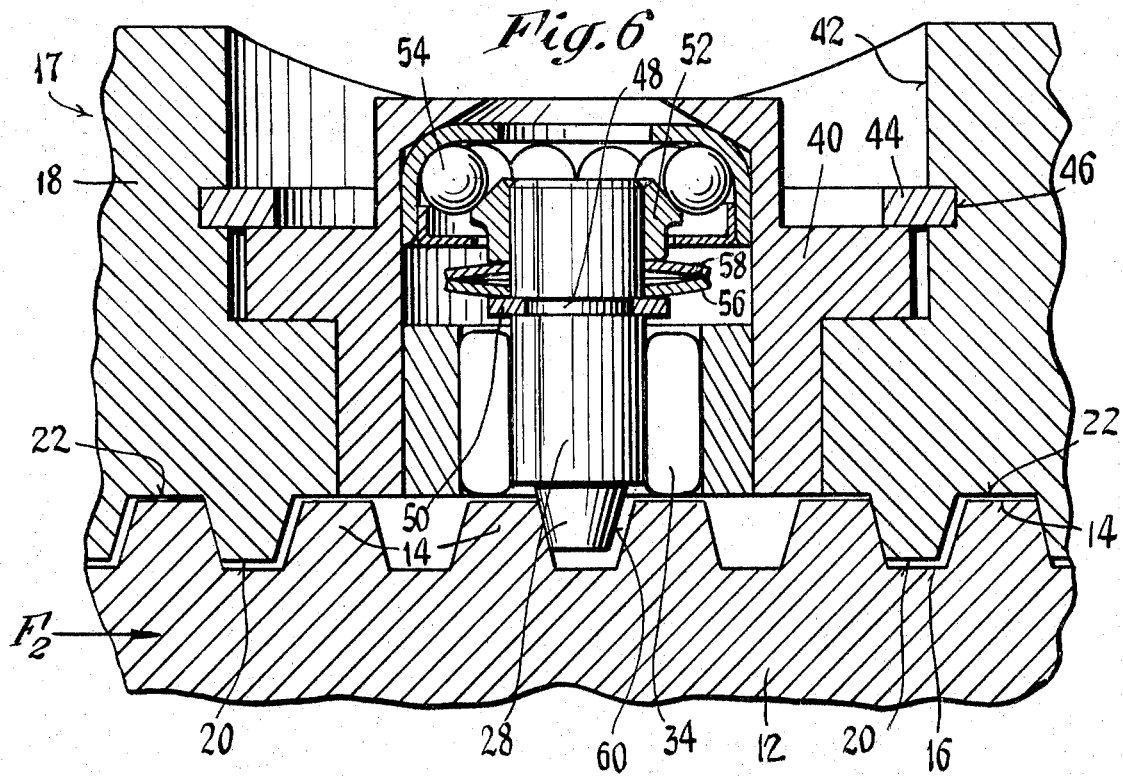
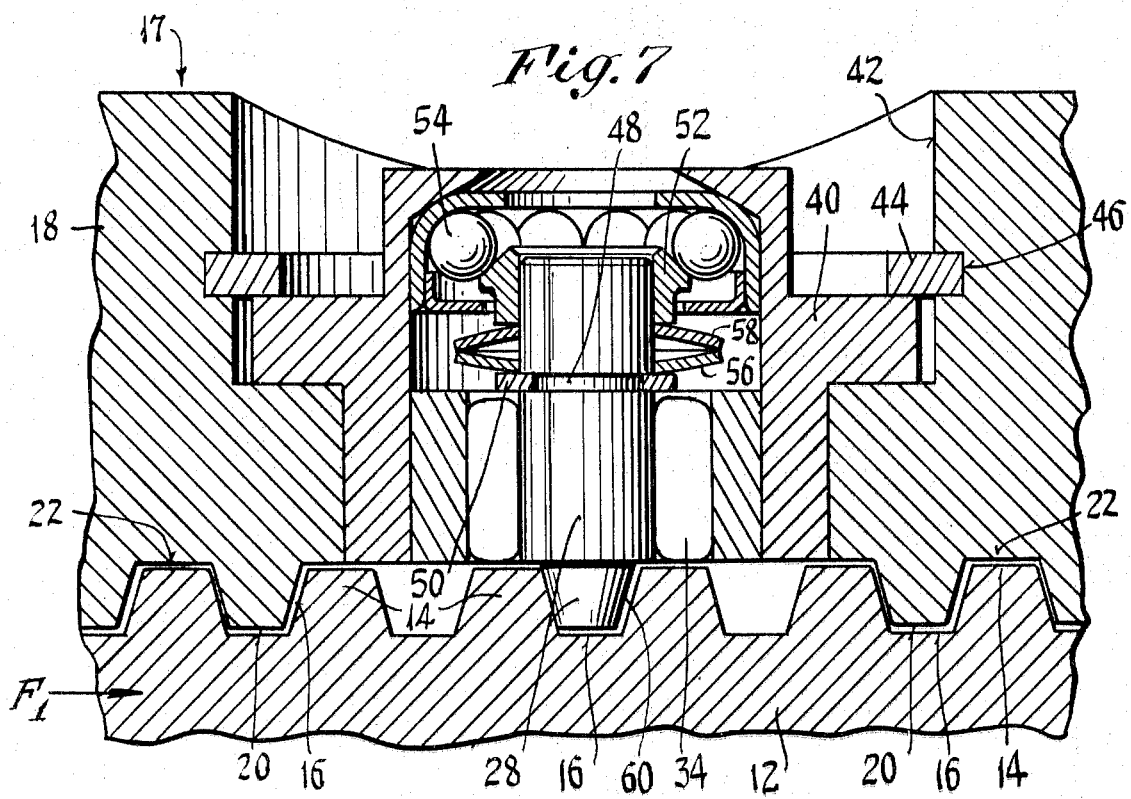

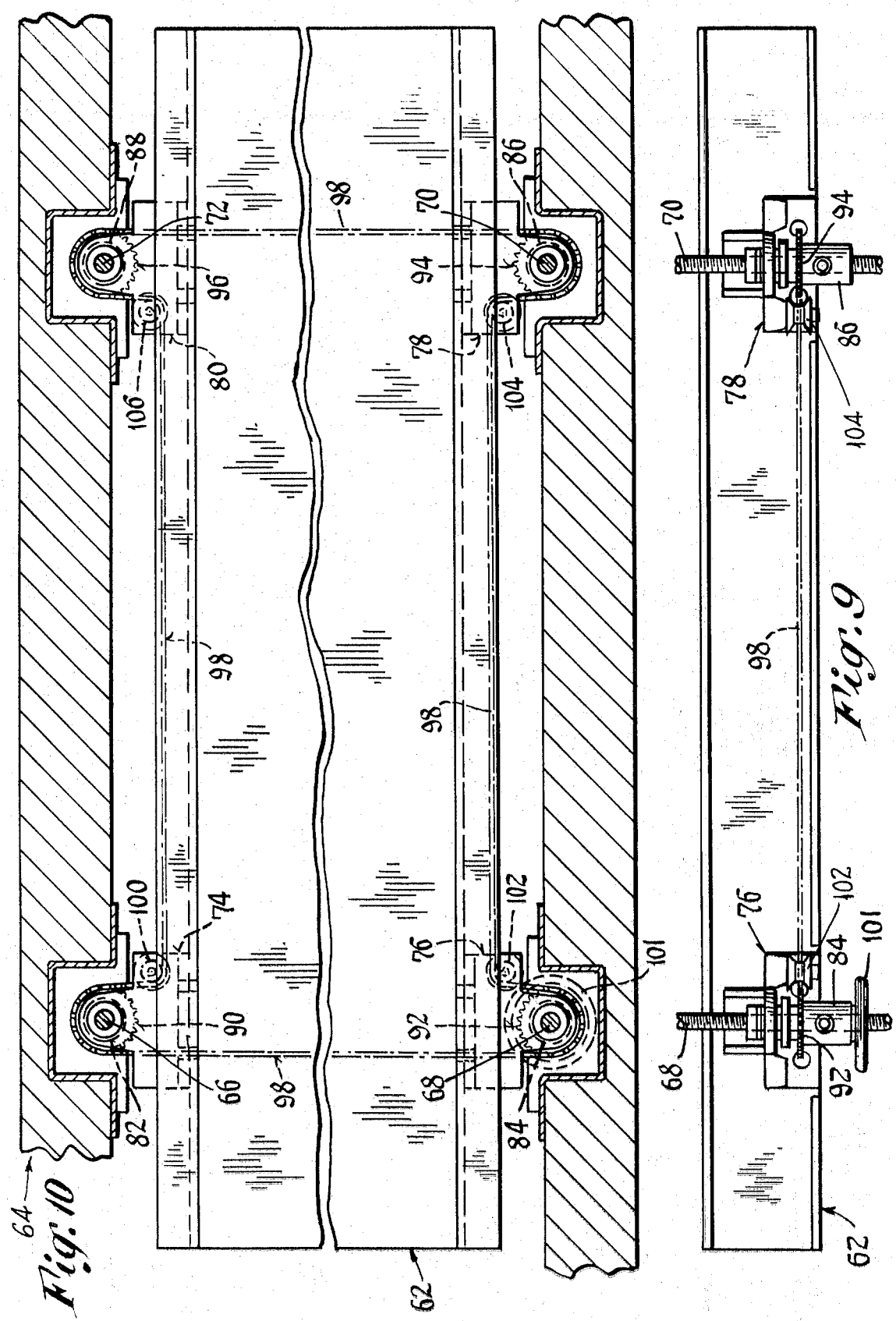

3,766,800

VARIABLE EFFICIENCY MECHANICAL TRANSMISSION

This invention relates generally to special types of mechanical transmissions involving screw elements, and more particularly to transmissions wherein a screw having a helical thread is associated with a nut provided with an anti-friction roller adapted for engagement with the screw thread. In the past a large number of different types of power transmission devices involving screws have been proposed and constructed. In cases where it was desired to retard relative turning movement between a screw and a thread-engaging nut, some type of pawl and ratchet arrangement was frequently employed; for example, a stationary screw could be engaged by a rotating nut, with the latter carrying a ratchet arranged to be cooperable with a pawl that is fixed with respect to the screw. The nut could be turned or advanced to a desired position, after which any rotation of the nut in the opposite direction was inhibited by the ratchet and pawl until the latter was manually released.

Other types of locking arrangements for nuts included the well-known back-to-back locking nut arrangement, wherein one nut was tightened against another to prevent relative turning movement of the nut and screw. Also, in the past, nuts having set screws to engage flat portions of a cooperable screw have frequently been employed to effect locking thereof onto the screw once a predetermined relative position was attained. While in general the locking arrangements described above operated satisfactorily for their specific purposes, the range of usefulness was often limited in that the locking or unlocking operation required additional tools (such as wrenches) or an additional manual operation (such as manually releasing a pawl.) In cases where there was inadequate space to easily effect such a locking and unlocking operation, the required activity was often cumbersome or awkward to perform, and frequently the tools required were not readily at hand.

SUMMARY

The above disadvantages and drawbacks of prior locking, back-check and similar mechanical transmissions of the type noted are obviated by the present invention which has for one object the provision of a novel and improved variable efficiency type locking transmission which is especially simple in its construction, reliable in operation, and which operates automatically to effect its locking or unlocking in response to the application and removal of heavy, axially loads applied thereto.

The above object is accomplished by a novel variable-efficiency type nut for a screw having a helical thread, said nut comprising an annular body adapted to travel along the length of the screw, and a roller carried by the nut body and normally engaging the thread of the screw, in conjunction with bearing means which mounts the roller not only for turning movement about its axis but also for axial movement between advanced and retracted positions with respect to its mounting. Yieldable means are provided for biasing the roller to its advanced position to normally maintain its engagement with the thread of the screw, and at least one shoulder or thread element is rigidly carried in the nut body and is normally out of engagement with the screw thread when the roller is in its advanced position. The biasing means enables the roller to yield and shift to its retracted position in response to heavy loading between the nut and the screw, such that the thread element or shoulder frictionally engages the screw thread to effect an increased drag therewith, which tends to retard relative turning movement between the nut body and screw. Upon removal of the heavy load, the roller assumes its advanced, thread-engaging position once again whereby the shoulder of the nut becomes disengaged from the screw threads, enabling the nut and screw to undergo free relative turning movement once again.

Other features and advantages will hereinafter appear.

In the accompanying drawings, illustrating one embodiment of the invention:

FIG. 6 is a fragmentary longitudinal section of the variable efficiency nut and helical thread screw illustrating the engagement of the screw thread by the thread elements or shoulders when the roller means are urged to the retracted position by heavy loading applied between the nut and screw.

FIG. 7 is a fragmentary longitudinal section of the variable efficiency nut and helical thread screw illustrating the clearance space between the nut threads and the screw threads when the roller is in its advanced, thread-engaging position.

FIG. 9 is a right end elevational view of the platform of FIG. 8, illustrating two of the variable efficiency transmissions of the present invention supporting the same.

FIG. 10 is a top plan view of the platform of FIGS. 8 and 9 illustrating an interconnecting chain for effecting simultaneous turning of the novel nuts of the present invention, as employed therewith.

Figure 1:
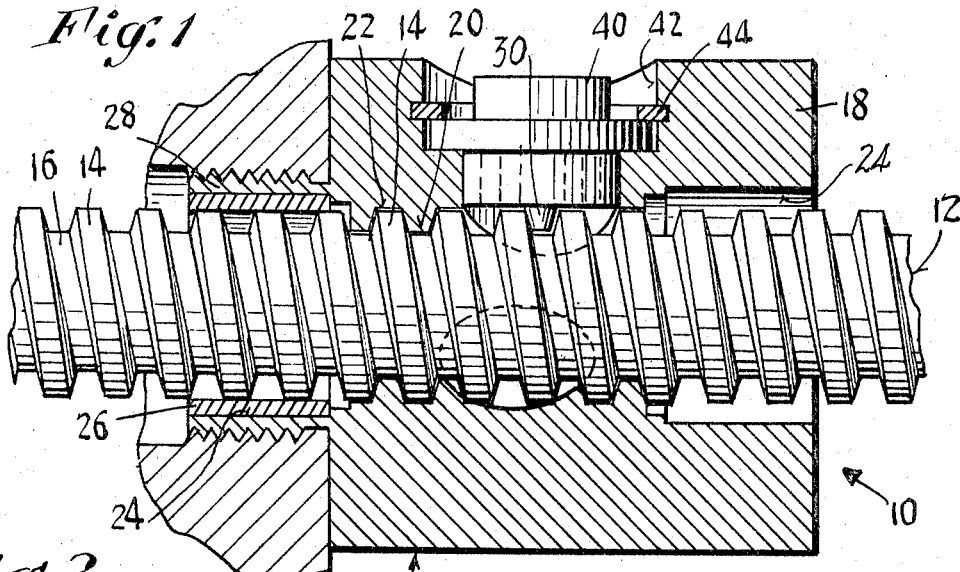
FIG. 1 is a longitudinal section of a variable efficiency transmission as provided by the present invention.
Figure 2:
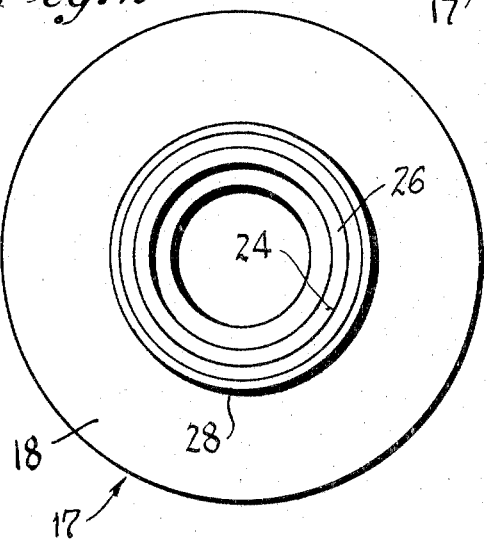
FIG. 2 is a left end elevational view of the nut part of FIG. 1.

Referring first to FIG. 1 there is illustrated a mechanical transmission generally designated by the numeral 10, including a screw 12 having a spiral thread comprising a crest 14 and groove 16, and including a nut 17 comprising an annular nut body or follower member 18 having an internal thread or crest 20 and groove 22, the thread 20 being adapted to mate with the screw thread 14. The nut illustrated in FIGS. 2–4 has a through bore 24 to receive the screw, and has a centralizing bushing 26 disposed at one end thereof, the bushing being press fitted into the bore 24 and centralizing the screw with respect to the nut. A threaded projecting hub 28, disposed at one end of the nut body, provides means for securing the nut to a plate or bracket with suitable hardware (not shown).

Figure 3:
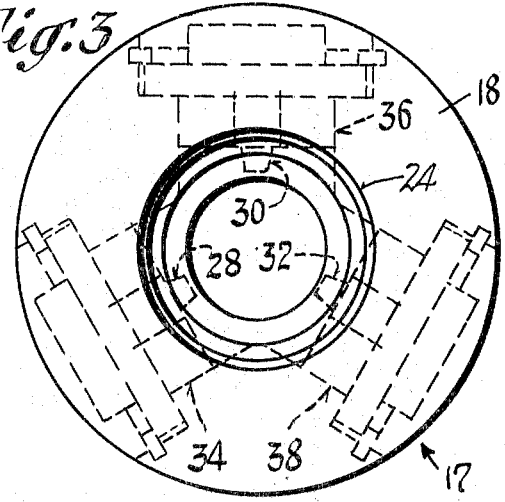
FIG. 3 is a right end elevational view of the nut part of FIG. 1.
Figure 4:
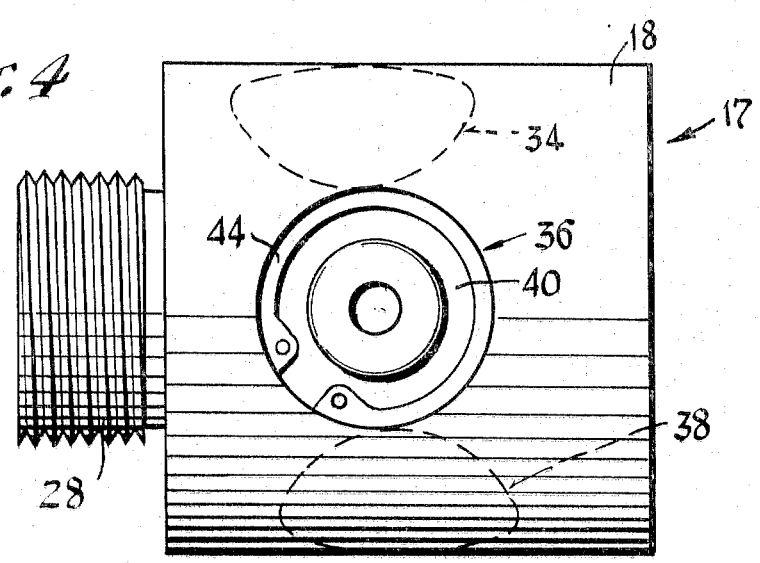
FIG. 4 is a top plan view of the nut part.
Figure 5:
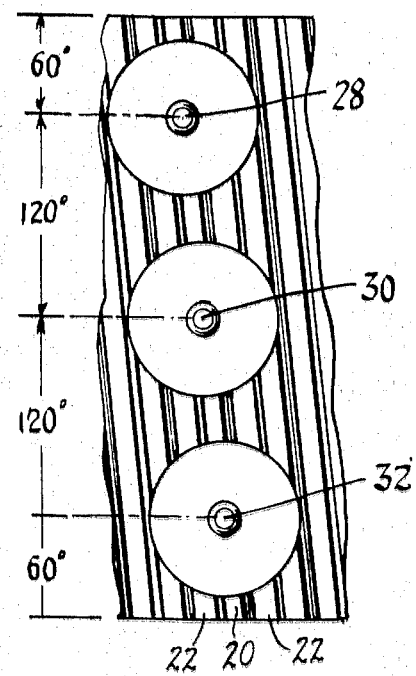
FIG. 5 is a development of the nut part of FIG. 3 illustrating the relative locations of the rollers with respect to the nut body.

In accordance with the present invention, the mating threads 14 and 20 of the screw and nut respectively, are constituted as to provide clearance spaces therebetween, such that the screw 12 if properly positioned can physically occupy the bore 24 of the nut without contact between the threads. The thread 20 is seen to constitute a shoulder which is rigidly carried in the bore 24 of the nut body 18 and which is engageable with the thread 14 of the screw 12. Further, by the present invention there is provided a plurality of rollers 28, 30 and 32, as illustrated in FIG. 3, the rollers being carried on the nut body 18 and extending radially into the bore 24 thereof so as to be engageable with the screw thread 14. The relative locations of the rollers with respect to the nut body 18 are illustrated in the FIG. 5 development of the nut. The rollers 28, 30 and 32 are carried on anti-friction bearings 34, 36 and 38 respectively, one of which is illustrated in FIGS. 6 and 7, the anti-friction bearings enabling free turning movement of the rollers about their respective axes. It is to be noted that the rollers 28, 30 and 32 are of substantially identical configuration, and the same is true with respect to the bearings 34, 36 and 38.

Referring to FIG. 6, the roller 28 and anti-friction bearing 34 constitute a cartridge and are carried in a housing 40 which is disposed in a radially extending hole 42 in the nut body 18. The cartridge housing 40 is held captive in the hole 42 by a retainer washer 44 received in a groove 46 of the wall thereof, as illustrated.

As seen in FIGS. 6 and 7, the roller 28 is provided with a transverse groove 48 in which there is received a split washer 50. In addition, a thrust bearing comprising a sleeve 52 and ball-bearing 54 is disposed at the innermost end of the cartridge adjacent the non-thread-engaging end of the roller 28. A pair of back-to-back spring washers 56, 58 engage the washer 50 and the sleeve 52. It should be noted that the roller 28 is of slightly smaller diameter than both the inner race of the needle bearing 34 and the inner wall of the sleeve 52, such that the roller 48 can undergo limited sliding movement in a direction parallel to its axis. By the above arrangement, the roller is biased inwardly to the position illustrated in FIG. 7, hereinafter referred to as the "advanced" position. The bowed washers 56, 58 thus constitute yieldable means biasing the roller 28 into engagement with the thread 14 of the screw 12.

The operation of the variable efficiency screw-type transmission of the present invention can now be readily understood by referring to FIGS. 6 and 7. FIG. 7 illustrates the roller 28 biased to its advanced, thread-engaging position by the spring washers 56 and 58. For this position the roller 28 and the rollers 30 and 32 are engaging the thread 14 of the screw 12 at such times that a relatively light axial load is applied to the latter in the direction indicated by the arrow "$F_1$" relative to the nut. Under this circumstance, as the nut and screw undergo relative rotation, the frictional drag therebetween is extremely small since the three rollers are the only portions of the nut engaging the screw 12, and each is free to rotate during their engagement (with one wall of the groove 16). As illustrated in FIG. 7 there exists a space between the crest 14 and walls of the groove 16 of the screw 12 on the one hand, and the walls of the groove 22 and crest 20 of the nut thread 14 on the other hand, such that the screw occupies the bore 24 of the nut without contact between the cooperable or mating threads thereof.

Referring now to FIG. 6 it is seen that the roller 28 has a tapered configuration at its thread-engaging end 60. It will be understood that when a force "$F_2$" applied in the direction indicated in FIG. 6 exceeds a predetermined amount, the thread 14 of the screw will tend to cam the tapered end 60 of the roller in a manner that the latter will be urged radially outward to its retracted position, which is the position illustrated in FIG. 6. This camming occurs against the action of the spring washers 56 and 58. As this happens it will be seen that the thread 20 of the nut and the thread 14 of the screw will be brought into engagement with one another. This engagement occurs along virtually the entire length of the mating nut and screw threads, and as a result a greatly increased contact area therebetween is effected. By the above arrangement, any tendency toward further relative turning movement between the nut and screw is inhibited by a greatly increased frictional drag force resulting from the sliding contact area. A beneficial useful result is thus realized, since the mechanism can now be adapted for use as an automatic "back-check" which responds to the application of a heavy load, by automatically "locking" itself with the parts in the relative positions occupied at the time such a heavy load is applied. Upon removal of the load, the spring washers 56 and 58 shift the roller 28 to its advanced position (FIG. 7) once again, wherein the nut and screw are free to resume efficient, low-drag, relative turning movement. It will be understood that in the presence of a heavy load, each of the rollers 28, 30, 32 is urged to its retracted position, since the rollers are of substantially identical configuration and the spring washers employed therewith provide roughly equivalent biasing forces thereto, respectively.

Figure 8:
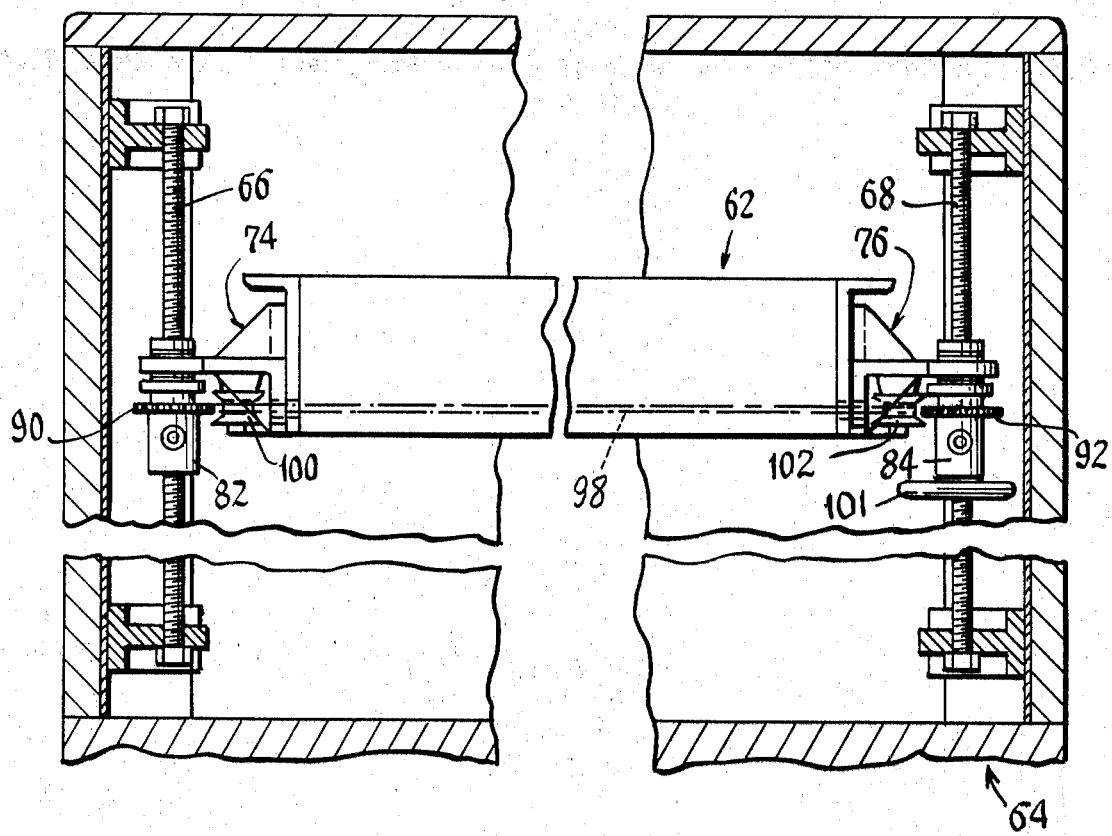
FIG. 8 is a front elevational view of an adjustable platform employing the variable efficiency transmission of the present invention, the platform being adapted to support articles or merchandise above a flat surface such as a trailer truck flat bed.

A typical application for the novel variable efficiency transmission of the present invention is illustratd in FIGS. 8–10, wherein there is shown a vertically adjustable platform 62 for a trailer truck 64. The platform is substantially rectangular in shape and is supported by four screws 66, 68, 70 and 72 respectively which are fixed and non-rotating. The platform has four brackets 74, 76, 78 and 80, two of which are disposed respectively on opposite sides thereof, each of the brackets carrying a variable efficiency nut substantially identical to that illustrated in FIGS. 1–7, the four nuts being designated 82, 84, 86 and 88 respectively. Each of the nuts is rotatably mounted on its respective bracket for turning movement. Also, there is associated with each nut a sprocket wheel rigidly fastened thereto, the sprocket wheels being designated by the numerals 90, 92, 94 and 96 respectively. A chain 98 connects each of the sprocket wheels for effecting simultaneous turning movement of each of the nuts 82–88 when any one thereof is turnably driven. Guide pulleys for the chain 98, designated 100, 102, 104 and 106 are carried respectively by the brackets 74, 76, 78 and 80, as illustrated best in FIGS. 9 and 10. One of the nuts 84 is further provided with a crank handle 101 to enable the four nuts to be simultaneously manually rotated in order to raise and lower the platform.

The operation of the platform incorporating the variable efficiency nut of the present invention can be readily understood. It is to be noted that the platform 62 is of such a weight, when unloaded, that the rollers carried by the nuts supporting the platform remain biased to their advanced positions (as in FIG. 7), wherein the load (due to the weight of the platform) is sustained entirely by the nut rollers and not by the nut thread 20. Under this circumstance, the threads 14 of the screws are out of engagement with the mating threads 20 of the nuts and the frictional drag therebetween is very low. Thus, the adjustment of the unloaded platform 62 to the desired position is easily accomplished by manual rotation of the crank handle 101. After the desired position of the platform is attained, it can be loaded with the merchandise to be stored or shipped, such loading preferably being accomplished by a fork-lift (not shown) or by other mechanical means. The additional weight of the merchandise on the platform causes an appreciable additional load on the nuts 82, 84, 86 and 88, such that the rollers thereof are all cammed radially outwardly to their retracted positions, respectively (as in FIG. 6) whereby the threads of the nuts frictionally engage the respective threads of the screws. Due to the large friction of contact between the respective nut and screw threads, the drag force therebetween is sufficient to oppose any further relative turning. Thus the platform 62 remains fixed in the pre-set position until the merchandise is unloaded, at which time the rollers of the nuts resume their advanced positions respectively, thus enabling easy manual readjustment of the platform position to a different elevation, if desired. It will be understood that the particular load applied to the platform, at which the locking takes place, will depend upon the stiffness of the spring washers 56, 58 and also upon the number of rollers carried by the nut. By employing washers having greater stiffness, the platform can be made to sustain a heavier load prior to locking. Also, the provision of additional rollers spaced about the nut body will have the same effect of increasing the load at which locking occurs.

There are a number of advantages in the above arrangement. Since the operator of the crank handle is sometimes in an awkward position while adjusting the platform, it is important that the force required to perform the adjustment be made minimal. By the present invention, the manual adjustment of the position of the unloaded platform is made especially easy by the provision of the anti-friction rollers engaging the screw threads. In addition, the platform is automatically "locked" in its pre-set position once it has been loaded, due to the weight of the merchandise. Thus, the operator need not operate any additional levers or mechanism to effect such a locking operation. Finally, readjustment of the position of the platform to a different elevation is readily accomplished once the particular merchandise has been unloaded, thus providing for extremely flexible operation. The above construction represents an extremely safe mechanism, since the platform, when heavily loaded, cannot descend of its own accord. The load bearing capacity is determined by the strength of the cooperable threads on the nut and the screw, and not upon that of the roller elements. As a result, the likelihood of injury to personnel is virtually eliminated.

From the above it can be seen that I have provided a novel and improved variable efficiency transmission and nut which is extremely simple in construction and foolproof in operation. The device thus represents a distinct advance and improvement in mechanical transmission technology. Variations and modifications are possible without departing from the spirit of the invention.

I claim:

1. A variable effiency nut for a screw comprising, in combination:
    a. an annular nut body having a through bore to receive the screw,
    b. a roller carried by said nut body and extending into the bore thereof so as to be engageable with the thread of the screw,
    c. bearing means mounting the roller for turning movement about its axis, and for movement between advanced and retracted positions in the body,
    d. yieldable means biasing the roller to its advanced position for engagement with the thread of the screw, and
    e. a shoulder rigidly carried in the bore of the nut body and engageable with a part of the screw thread,
    f. said shoulder being normally out of engagement with the screw thread when the roller is in its advanced position adapted to engage the thread,
    g. said yieldable biasing means enabling the roller to yield and shift to its retracted position in response to heavy lateral loading thereon by the screw, such that the shoulder of the nut body frictionally engages the screw thread and effects an increased drag therewith, thereby tending to retard relative turning between the nut body and screw.

2. The invention as defined in claim 1, and further including:
    a. a screw having a spiral thread with crests and grooves,
    b. said shoulder comprising a portion of a screw thread adapted to mate with the thread of said screw, and
    c. said mating screw threads being so constituted as to provide clearance spaces therebetween whereby the screw can physically occupy the bore of the nut without contact between said threads,
    d. said roller normally tending to maintain a spacing between said threads so as to keep the same out of contact with each other.

3. The invention as set forth in claim 1, and further including:
    a. additional rollers carried by said nut body and spaced about the inner periphery thereof,
    b. bearing means mounting said additional rollers for turning movement about their respective axes, and for movement between advanced and retracted positions, and
    c. yieldable means biasing said rollers into their advanced positions for engagement with the screw thread.

4. The invention as set forth in claim 2, wherein:
    a. the thread of the nut extends in opposite directions axially of said roller.

5. The invention as set forth in claim 1, wherein:
    a. said shoulder comprises a multiturn helical thread which is interrupted intermediate its length by said roller.

6. The invention as set forth in claim 1, wherein:
    a. the roller has a tapered configuration at its thread engaging end,
    b. said yieldable biasing means urging the roller in an advanced direction radially inward of the nut body.

7. The invention as set forth in claim 6, wherein:
a. said yieldable biasing means comprises a bowed spring washer.

8. The invention as set forth in claim 5, and further including:
a. a plurality of biased rollers movable between advanced and retracted positions and extending into the bore of the nut, said rollers being disposed along said multiturn helical thread.

9. The invention as set forth in claim 1, wherein:
a. said bearing means comprises a needle bearing engaging the lateral surface of the roller, and
b. a ball thrust bearing disposed adjacent the non-thread-engaging end of the roller.

10. A variable efficiency mechanical transmission means for use with a screw comprising, in combination:
a. a follower member,
b. a roller carried by said member and adapted for engagement with the thread of the screw,
c. bearing means mounting the roller on said member for turning movement about its axis.
d. yieldable means for biasing the roller to an advanced position for effecting engagement thereof with the screw thread, and
e. a shoulder rigid on said member and adapted for cooperable engagement with a part of said thread,
f. said shoulder being arranged so it is normally out of engagement with the thread when the roller is in said advanced position,
g. said yieldable biasing means enabling the roller to shift to a retracted position in response to heavy lateral loading thereon by the screw, such that the shoulder of the member frictionally engages the screw thread and effects an increased drag therewith, tending to retard relative turning between the follower member and screw.

* * * * *